United States Patent [19]

Hecht et al.

[11] Patent Number: 4,499,856
[45] Date of Patent: Feb. 19, 1985

[54] MEANS FOR LOADING FOWL ONTO A TRANSPORTING VEHICLE

[76] Inventors: Betsalel Hecht; Silviu Hecht, both of P.O.B. 231, Ashqelon 78101, Israel

[21] Appl. No.: 525,546

[22] Filed: Aug. 22, 1983

[30] Foreign Application Priority Data

Aug. 23, 1982 [IL] Israel .......................................... 66627

[51] Int. Cl.³ .......................... B60P 3/04; A01K 29/00
[52] U.S. Cl. ..................................................... 119/82
[58] Field of Search ................. 119/12, 15, 82; 280/63

[56] References Cited

U.S. PATENT DOCUMENTS

| 880,665 | 3/1908 | Hopper | 119/82 |
| 3,253,577 | 5/1966 | Lund | 119/82 |
| 3,871,335 | 3/1975 | Johnston et al. | 119/82 |
| 3,949,706 | 4/1976 | Coon, Jr. | 119/58 X |
| 4,074,658 | 2/1978 | Mermelstein et al. | 119/82 |

Primary Examiner—Robert P. Swiatek
Attorney, Agent, or Firm—Toren, McGeady and Stanger

[57] ABSTRACT

To load live turkeys onto a vehicle for transporting the birds to processing plants a device is provided including a four-sided, elongated chassis or frame having at one end thereof a pair of wheels, the wheels are connected to the frame by an hydraulic cylinder and at its opposite end a coupling device for attachment to a tractor. The coupling device—in turn—is connected to the frame by a second hydraulic cylinder. The arrangement further includes a collecting cage in which the birds are assembled which cage is raised by an appropriate member to a level at which the birds are chased into another cage.

5 Claims, 5 Drawing Figures

MEANS FOR LOADING FOWL ONTO A TRANSPORTING VEHICLE

BACKGROUND OF THE INVENTION

Turkeys which are brought up in fowl hatching establishments, when having reached a certain size and weight, are transported in cages to slaughtering and meat processing plants. Customarily three tiers of cages are stacked on the platform of a lorry. The cages have sidewardly opening doors. The lorry with the cages thereon is driven to a point opposite the exit from the turkey run, the birds are retrieved therefrom manually and are—one at a time—introduced into the cages. Each cage is destined to hold a number of birds. It will be realised that the operation of loading a multitude of birds onto a lorry, using the method referred to above, is not only time consuming but hard work (in view of the size and weight of the birds) which requires participation of several workers.

OBJECT OF INVENTION

It is the object of the present invention to provide improved means for the loading of turkeys.

SHORT SUMMARY OF DISCLOSURE

The new means according to the present invention is constituted by a four-sided, elongated chassis or frame having at one end thereof a pair of wheels, said wheels being connected to said frame by means of an hydraulic cylinder and at its opposite end coupling means for attachment to a tractor, said coupling means being further connected to the frame by means of a second hydraulic cylinder, means being provided on said chassis for placing thereon a large cage (to be referred to as "collector"), and means for raising the collector to the desired level, means being provided to extend the "floor" of said "collector" when in use.

SHORT DESCRIPTION OF APPENDED DRAWINGS

The invention will now be described in detail with reference to the accompanying drawings, wherein:

FIG. 4 is a like side view of the vehicle in travelling position,
while

DETAILED DESCRIPTION OF PREFERRED EMBODIMENT

Figure 1:
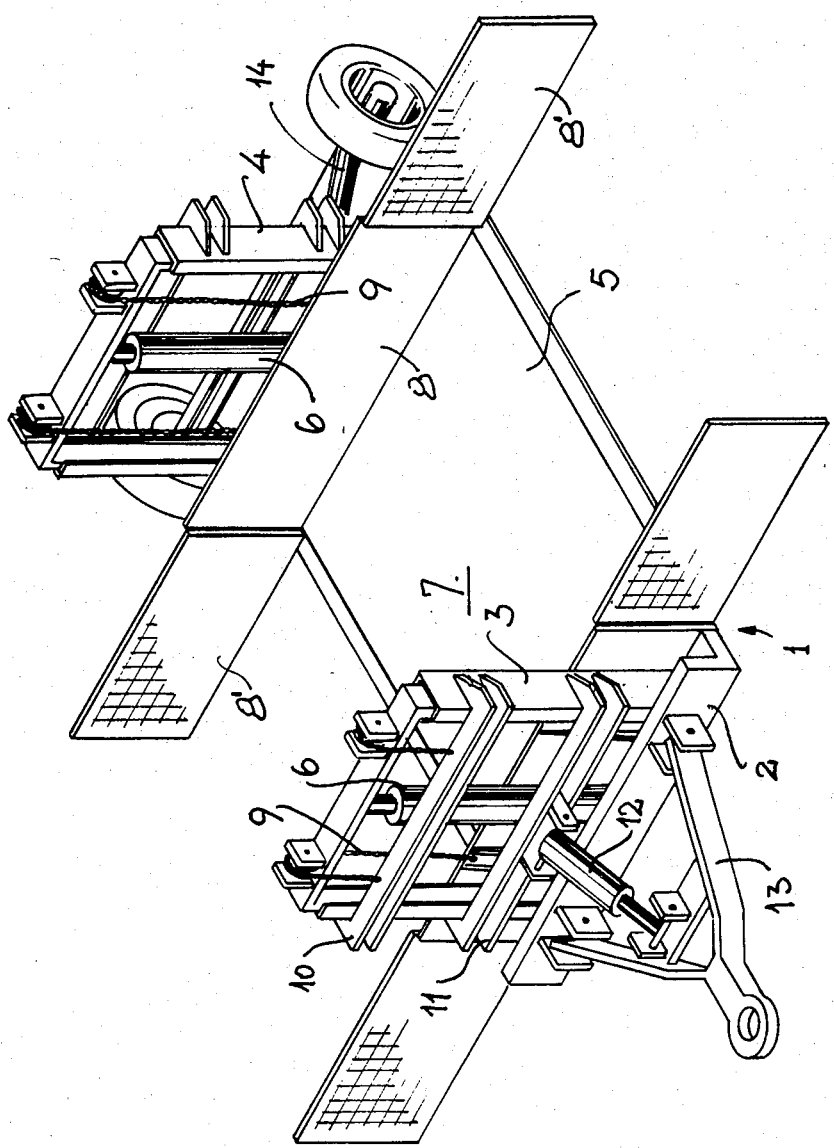
FIG. 1 is a perspective view of the vehicle to be used in the new method, being shown in the lowermost position ready to be loaded.
Figure 2:
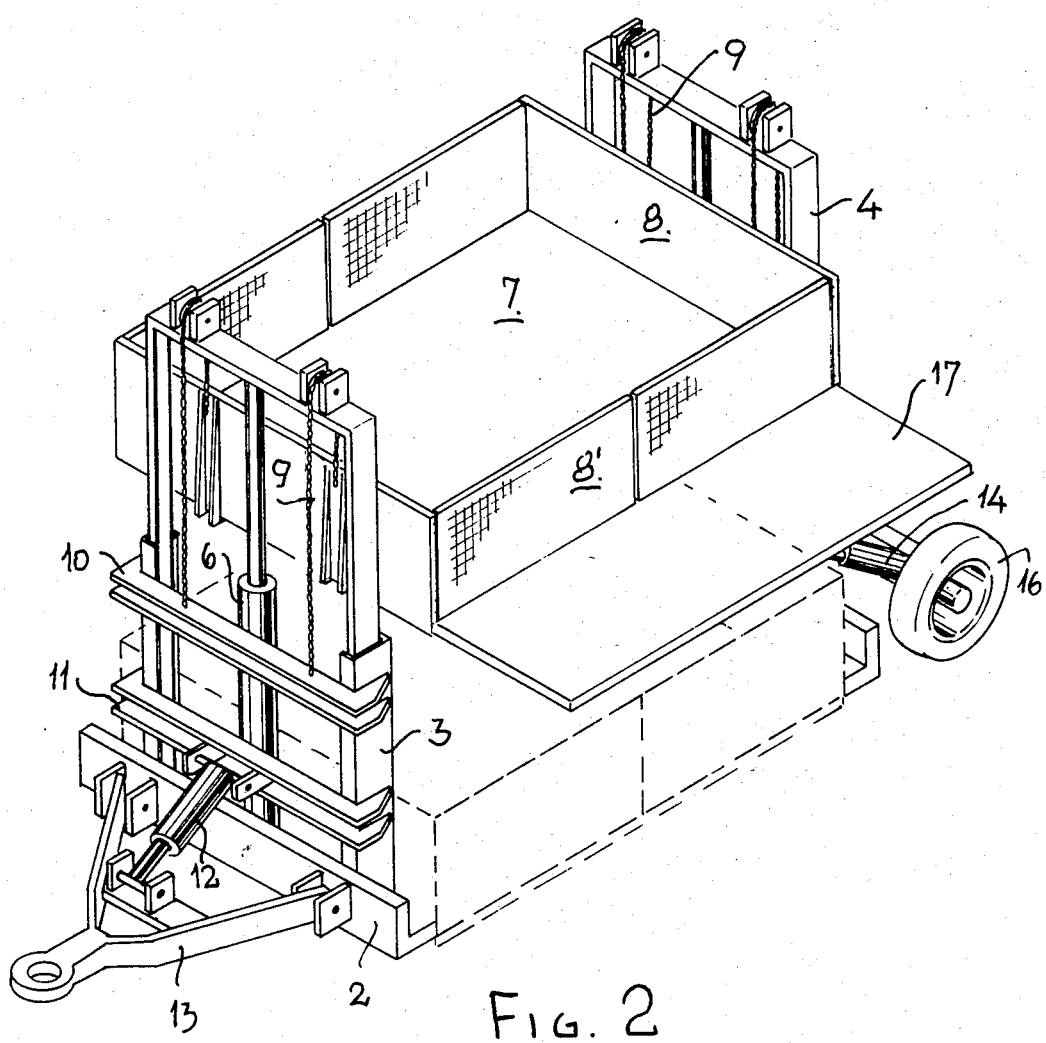
FIG. 2 is a like view of the vehicle, showing it in position of use, with extendable bottom.
Figure 3:
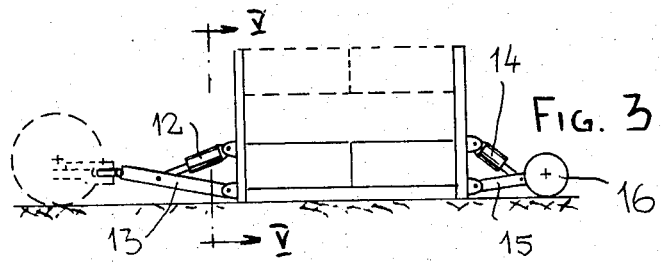
FIG. 3 is a schematical side view of the vehicle in working position.
Figure 4:
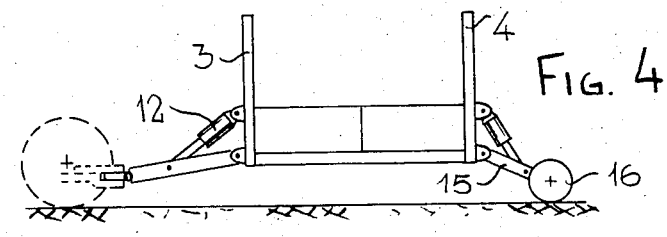
Figure 5:
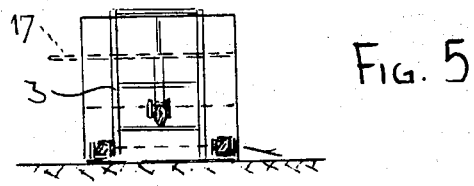
FIG. 5 is an end view of the vehicle.

Turning first to FIGS. 1 and 2 of the annexed drawings, the vehicle which conveys the collector to the proper location is designated as a whole by the numeral 1. It comprises a chassis 2, to the two ends of said chassis extensible frame structures 3 and 4 are connected. Intermediate the two extensible frames 3 and 4 the collector 5 is placed.

Within each of the frame like structures 3 and 4 is positioned a jack 6, the cylinder of which is connected to the bottom part of the frame while the piston rod is fixed to the upper part.

The collector 5 is a cage having a bottom 7, two end walls 8 and openable doors 8' at its two opposite, longitudinal sides. To two end walls 8 are fixedly connected chains or cables 9, led over pulleys 9', the other ends of which chains or cables are connected to transverse beam 10 which is part of the frame structures 3 and 4. To a second transverse beam 11 is connected the cylinder of a jack 12 its piston rod is connected to the vehicle's tractor hitch member 13, a like jack 14 is attached to the rear part of the vehicle and to an extension 15 to which a pair of wheels 16 are journalled.

There are also provided conduits (not shown) leading from a source of pressurized fluid on the tractor (as commonly provided) to the cylinders of the jacks. The bottom part of the collector has at its two sides extensible portions 17 which may be operated manually or hydraulically.

Into the space between the doors of a fowl run in which the turkeys move freely (not shown), and a lorry which is to be loaded (or unloaded) is pulled the vehicle 1, by means of a tractor. The gap between the lorry and the collector or between the fowl run and the collector is closed by means of the extensible portions 17.

After unhitching the vehicle from the tractor—it is lowered to the ground, by means of hydraulic jacks 12 and 14. Now the doors of the fowl run and the doors of the collector 5 facing the fowl run are swung open. Thus turkeys can be chased from the fowl run into the collector 5. They cannot escape sidewardly, being closed in by both doors 8' of the collector. Then the doors of the collector which face the fowl run are shut, the doors facing the lorry are opened to enable the transfer of the birds into the lowermost tier of transport cages on the lorry.

When these latter cages are full, the collector is raised to the level of the second tier and the transfer of birds into these cages is performed. Finally the collector is raised to the level of the uppermost tier and the remaining birds in the collector are transferred into transport cages.

Raising of the collector is achieved by means of the hydraulic or pneumatic jacks 6 which expand under urge of pressure fluid causing the upper part of frame 3 to slide within the lower part, as can be seen in FIG. 2. Pressurized fluid is fed into the cylinder from the source on the tractor.

When all birds have been transferred into the transport cages the collector 5 is lowered and the whole vehicle 1 is raised from ground level by means of jacks 12 and 14 to be pulled away by the tractor.

We claim:

1. A means for loading fowl into a transporting vehicle comprising a structure including a four-sided generally horizontally arranged chassis having a pair of opposite first sides and a pair of opposite second sides extending between said first sides with said second sides being elongated relative to said first sides, a pair of wheels located adjacent and outwardly from one of said first sides, a first hydraulic cylinder connected to said one of said first sides and to said pair of wheels for pivoting said pair of wheels in the vertical direction relative to said chassis between a first position spaced below said chassis and a second position spaced vertically upwardly from the first position relative to said chassis, coupling means located at and extending outwardly from the other said first side for attaching said structure to a prime mover, a second hydraulic cylinder connected to said coupling means and to said other first side for moving said coupling means vertically relative to said chassis between a lower position comparable to said first position of said pair of wheels and an upper position comparable to said second position to said pair of wheels, a collector cage mounted on on said chassis, said collector cage having a horizontally arranged floor, and means mounted on said chassis and connected to said collector cage for moving said collector cage upwardly and downwardly relative to said chassis so that said floor thereof is at a selected level.

2. A means for loading fowl, as set forth in claim 1, including means for extending the floor of said collector cage.

3. A means for loading fowl, as set forth in claim 2, wherein said means for extending the floor is displaceable horizontally outwardly from said floor of said collector cage along a different one of said second sides of said chassis.

4. A means for loading fowl, as set forth in claim 1, wherein said means for moving said chassis includes an upwardly extensible frame structure at each of said first sides of said chassis, a third hydraulic cylinder for extending said frames, cables connected to said frame and to said collector cage for selectively moving said collector cage in the upward and downward directions in response to the movement of said frames by said third cylinder.

5. A means for loading fowl, as set forth in claim 4, wherein said collector cage comprises a pair of end walls extending upwardly from said floor with each said end wall located adjacent a different one of said first sides of said chassis and a pair of side walls extending upwardly from said floor and between said end walls with each of said side walls locating along a different one of said second sides of said chassis, each of said side walls including openable doors.

* * * * *